United States Patent
Kanayama et al.

(10) Patent No.: US 10,179,533 B2
(45) Date of Patent: Jan. 15, 2019

(54) LIGHTING APPARATUS AND AUTOMOBILE INCLUDING THE SAME

(71) Applicant: Panasonic Intellectual Property Management Co., Ltd., Osaka (JP)

(72) Inventors: Yoshihiko Kanayama, Hyogo (JP); Hiro Aoki, Osaka (JP); Tomoyuki Ogata, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/156,942

(22) Filed: May 17, 2016

(65) Prior Publication Data

US 2016/0341385 A1 Nov. 24, 2016

(30) Foreign Application Priority Data

May 19, 2015 (JP) ................. 2015-101918

(51) Int. Cl.
| | |
|---|---|
| *B60Q 1/04* | (2006.01) |
| *F21S 8/10* | (2006.01) |
| *B60Q 1/00* | (2006.01) |
| *F21S 41/19* | (2018.01) |
| *F21S 41/143* | (2018.01) |
| *F21S 41/147* | (2018.01) |
| *F21S 41/29* | (2018.01) |
| *F21S 41/24* | (2018.01) |
| *F21S 41/255* | (2018.01) |
| *F21S 41/32* | (2018.01) |
| *F21S 41/663* | (2018.01) |
| *F21S 45/47* | (2018.01) |
| *F21S 45/50* | (2018.01) |

(52) U.S. Cl.
CPC .......... *B60Q 1/0058* (2013.01); *F21S 41/143* (2018.01); *F21S 41/147* (2018.01); *F21S 41/19* (2018.01); *F21S 41/24* (2018.01); *F21S 41/255* (2018.01); *F21S 41/295* (2018.01); *F21S 41/322* (2018.01); *F21S 41/663* (2018.01); *F21S 45/47* (2018.01); *F21S 45/50* (2018.01)

(58) Field of Classification Search
CPC ...... B60Q 1/0058; B60Q 1/0041; B60Q 1/04; B60Q 1/18; F21S 48/1216; F21S 48/125; F21S 41/143; F21S 41/255; F21S 41/337
USPC ........................................................ 362/519
See application file for complete search history.

(56) References Cited

U.S. PATENT DOCUMENTS

| | | |
|---|---|---|
| 8,534,888 B2 | 9/2013 | Yasuda et al. |
| 9,039,262 B2 | 5/2015 | Yasuda et al. |

(Continued)

FOREIGN PATENT DOCUMENTS

| | | | |
|---|---|---|---|
| JP | 2012-059643 A | | 3/2012 |
| JP | 2012119285 A | * | 6/2012 |

*Primary Examiner* — Karabi Guharay
(74) *Attorney, Agent, or Firm* — Renner, Otto, Boisselle & Sklar, LLP (57) ABSTRACT

A lighting apparatus includes a low beam lens, a low beam light-emitting device disposed behind the low beam lens, a plurality of high beam lenses disposed along a periphery of the low beam lens, and a plurality of high beam light-emitting devices disposed behind the plurality of high beam lenses in one-to-one correspondence. At least one of the plurality of high beam lenses includes, on a circumferential edge, a textured surface having light diffusing characteristics.

7 Claims, 7 Drawing Sheets

(56) References Cited

U.S. PATENT DOCUMENTS

| | | | |
|---|---|---|---|
| 2007/0183164 A1* | 8/2007 | Naganawa | B60Q 1/085 362/507 |
| 2008/0247186 A1* | 10/2008 | Watanabe | B60Q 1/0041 362/538 |
| 2012/0063156 A1 | 3/2012 | Yasuda et al. | |
| 2012/0134167 A1* | 5/2012 | Huang | B60Q 1/0041 362/519 |
| 2013/0051045 A1* | 2/2013 | Kay | B61D 29/00 362/478 |
| 2013/0235606 A1 | 9/2013 | Yasuda et al. | |

* cited by examiner

LIGHTING APPARATUS AND AUTOMOBILE INCLUDING THE SAME

CROSS REFERENCE TO RELATED APPLICATION

This application claims the benefit of priority of Japanese Patent Application Number 2015-101918 filed on May 19, 2015, the entire content of which is hereby incorporated by reference.

BACKGROUND

1. Technical Field

The present disclosure relates to a lighting apparatus and an automobile including the lighting apparatus.

2. Description of the Related Art

Automobiles are equipped with lamps, such as headlamps, in the front. Lighting apparatuses used as headlamps include a low beam light source that emits a low beam, which is a passing beam, and a high beam light source that emits a high beam, which is a driving beam (for example, see Japanese Unexamined Patent Application Publication No. 2012-59643).

Light-emitting diodes (LEDs), which are known for their long lifespan, or laser devices are used as the low beam light source and the high beam light source (see Japanese Unexamined Patent Application Publication No. 2012-59643 for corresponding patent literature).

SUMMARY

In Japanese Unexamined Patent Application Publication No. 2012-59643, since the high beam light source is a light source for illuminating an area far ahead, a high-luminance high beam light source is required. However, high-luminance light sources generate a considerable amount of heat, and therefore require large heat dissipating fins. This increases the size of the lighting apparatus, making the lighting apparatus more difficult to use for automobile applications.

To address this, one conceivable solution is to use a plurality of high beam light sources to generate the high beam. However, in this case, the light emitted by the plurality of high beam light sources is uneven as a whole, which reduces the effectiveness of the lighting.

One object of the present disclosure is to provide a compact lighting apparatus capable of increasing lighting effectiveness.

In order to achieve the above object, a lighting apparatus according to one aspect of the present disclosure includes: a first lens; a first light source disposed behind the first lens; a plurality of second lenses disposed along a periphery of the first lens; and a plurality of second light sources disposed behind the plurality of second lenses in one-to-one correspondence. At least one of the plurality of second lenses includes, on a circumferential edge, a textured surface having light diffusing characteristics.

Moreover, an automobile according to one aspect of the present disclosure includes the lighting apparatus and a vehicle body including the lighting apparatus installed in a front portion.

According to the present disclosure, it is possible to provide a compact lighting apparatus that increases lighting effectiveness.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENT

The following describes a lighting apparatus and an automobile including the lighting apparatus according to an exemplary embodiment of the present disclosure with reference to the drawings. The exemplary embodiment described below illustrates a specific example of the present disclosure. The numerical values, shapes, materials, elements, the arrangement and connection of the elements, steps, the order of the steps, etc., in the following exemplary embodiment are mere examples, and therefore are not intended to limit the inventive concept. Therefore, among the elements in the following exemplary embodiment, those not recited in any of the independent claims defining the most generic part of the inventive concept are described as arbitrary elements.

As described herein, "front" and "forward" refer to the direction in which light is emitted from the lighting apparatus (i.e., the light-emitting direction) and the light-extraction direction in which light is extracted (i.e., the lighting direction), and "back" and "rearward" refer to the direction opposite the direction to which "front" and "forward" refer. Moreover, "front" and "forward" refer to the direction of travel when the automobile moves forward, "right" and "left" are from the perspective of the driver of the automobile when facing forward, "up" refers to the direction toward the ceiling of the automobile, and "down" and "downward" refer to the direction opposite the direction to which "up" refers.

The Z axis corresponds to the front and back directions, the Y axis corresponds to the up and down (vertical) directions, and the X axis corresponds to the left and right (horizontal) directions. In other words, in the following exemplary embodiment, the predetermined lighting direction refers to the direction in which the lighting apparatus projects light, i.e., "forward", i.e., the positive direction of the Z axis.

Note that the drawings are represented schematically and are not necessarily precise illustrations. Additionally, like elements share like reference numbers in the drawings.

Exemplary Embodiment

Automobile

Figure 1:
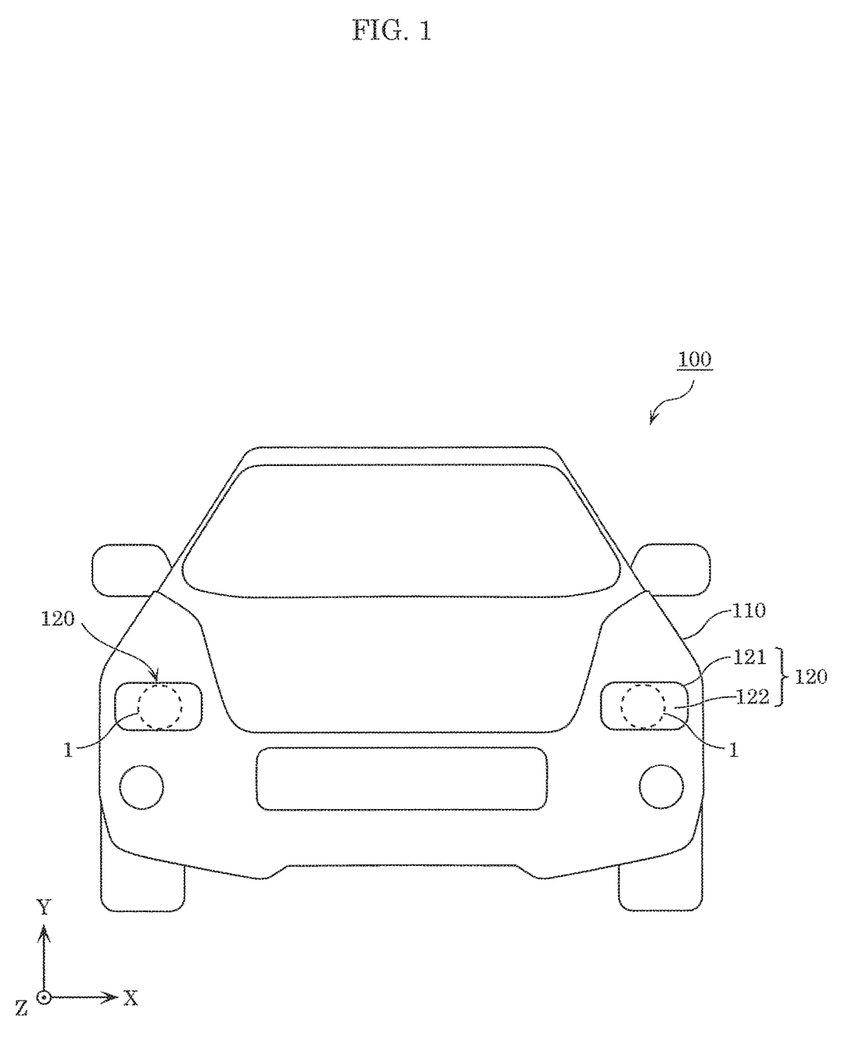
FIG. 1 is a front view of an automobile including a lighting apparatus according to an exemplary embodiment of the present disclosure.

First, automobile 100 according to the exemplary embodiment will be described with reference to FIG. 1. FIG. 1 is a front view of automobile 100 according to the exemplary embodiment.

As illustrated in FIG. 1, automobile 100 according to the exemplary embodiment is one example of a mobile object, such as a four-wheeled automobile, and includes vehicle body (vehicle) 110, and headlamps 120 disposed on the left and right sides of the front of vehicle body 110. Automobile 100 is, for example, an automobile propelled by a gasoline engine or an automobile propelled by an electric motor.

Headlamps 120 are lamps, and in the exemplary embodiment, are headlights installed on a vehicle (i.e., vehicle headlamps). Each headlamp 120 includes housing 121, front cover 122, and lighting apparatus 1 attached behind front cover 122.

Housing 121 is, for example, a metal housing, and includes an opening through which light from lighting apparatus 1 is emitted. Front cover 122 is a light-transmissive headlamp cover and is disposed at the opening of housing 121. Housing 121 and front cover 122 are sealed together to prevent water or dust, for example, from entering housing 121.

Lighting apparatus 1 is disposed behind front cover 122 and attached to housing 121. Light emitted by lighting apparatus 1 passes through front cover 122 and exits headlamp 120.

Lighting Apparatus

Next, lighting apparatus 1 according to the exemplary embodiment will be described with reference to FIG. 2 through FIG. 4.

Figure 2:
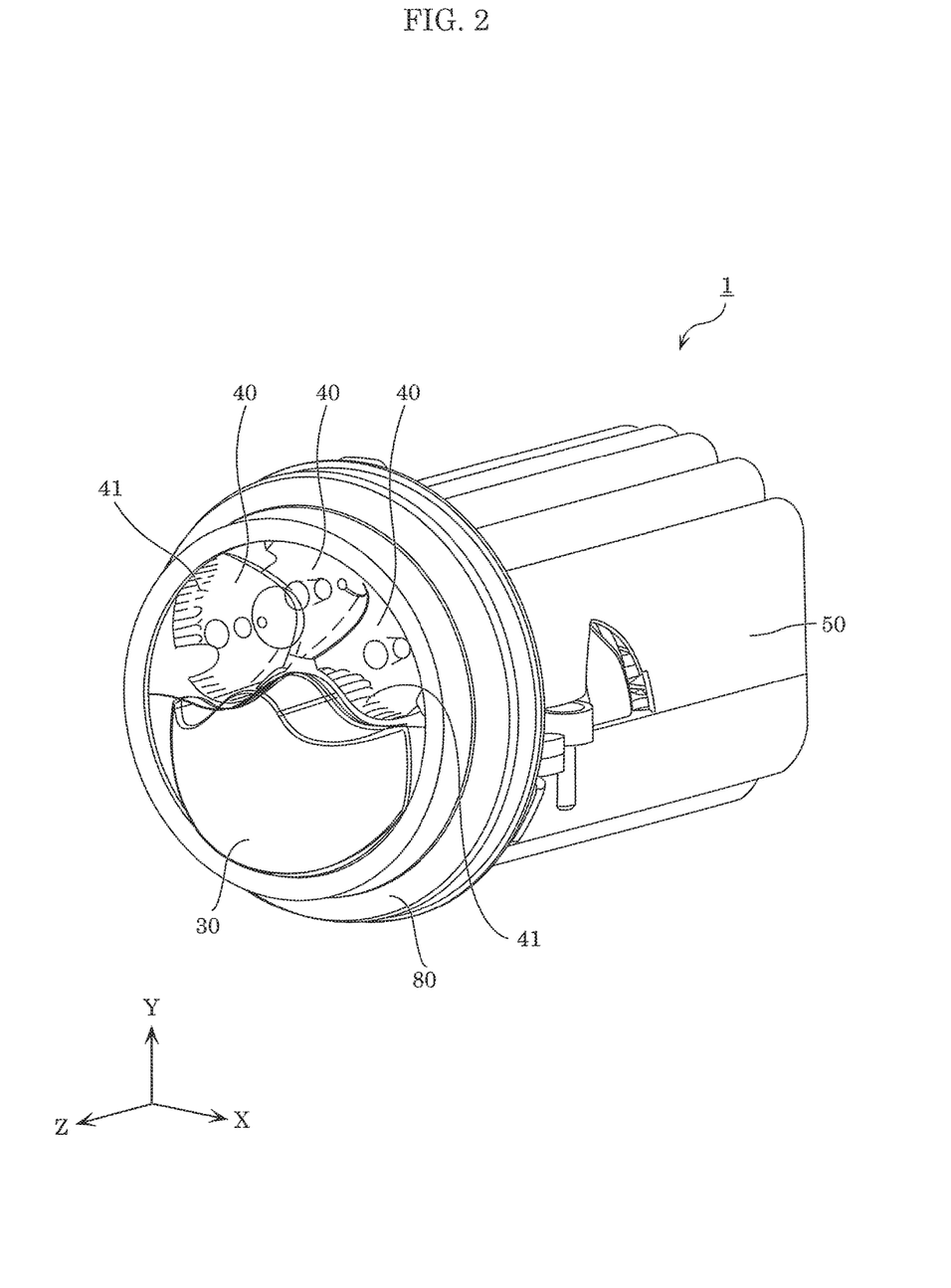
FIG. 2 is a perspective view of a lighting apparatus according to an exemplary embodiment of the present disclosure.

FIG. 2 is a perspective view of lighting apparatus 1 according to the exemplary embodiment. FIG. 3 is a perspective view of lighting apparatus 1 according to the exemplary embodiment when cover 80 is removed. FIG. 4 is a cross sectional view of lighting apparatus 1 according to the exemplary embodiment. More specifically, FIG. 4 is a cross section taken parallel to the YZ plane, approximately through the center of lighting apparatus 1, and is a view looking in the negative direction of the X axis.

Lighting apparatus 1 according to the exemplary embodiment is installed on a mobile object. Lighting apparatus 1 is, for example, a vehicle lighting apparatus used in a vehicle headlamp, and emits light forward. In other words, "forward" relative to the vehicle is equivalent to the light-emitting direction of lighting apparatus 1, and equivalent to the lighting direction of lighting apparatus 1. As illustrated in FIG. 1, lighting apparatuses 1 are disposed in the front of vehicle body 110.

Figure 3:
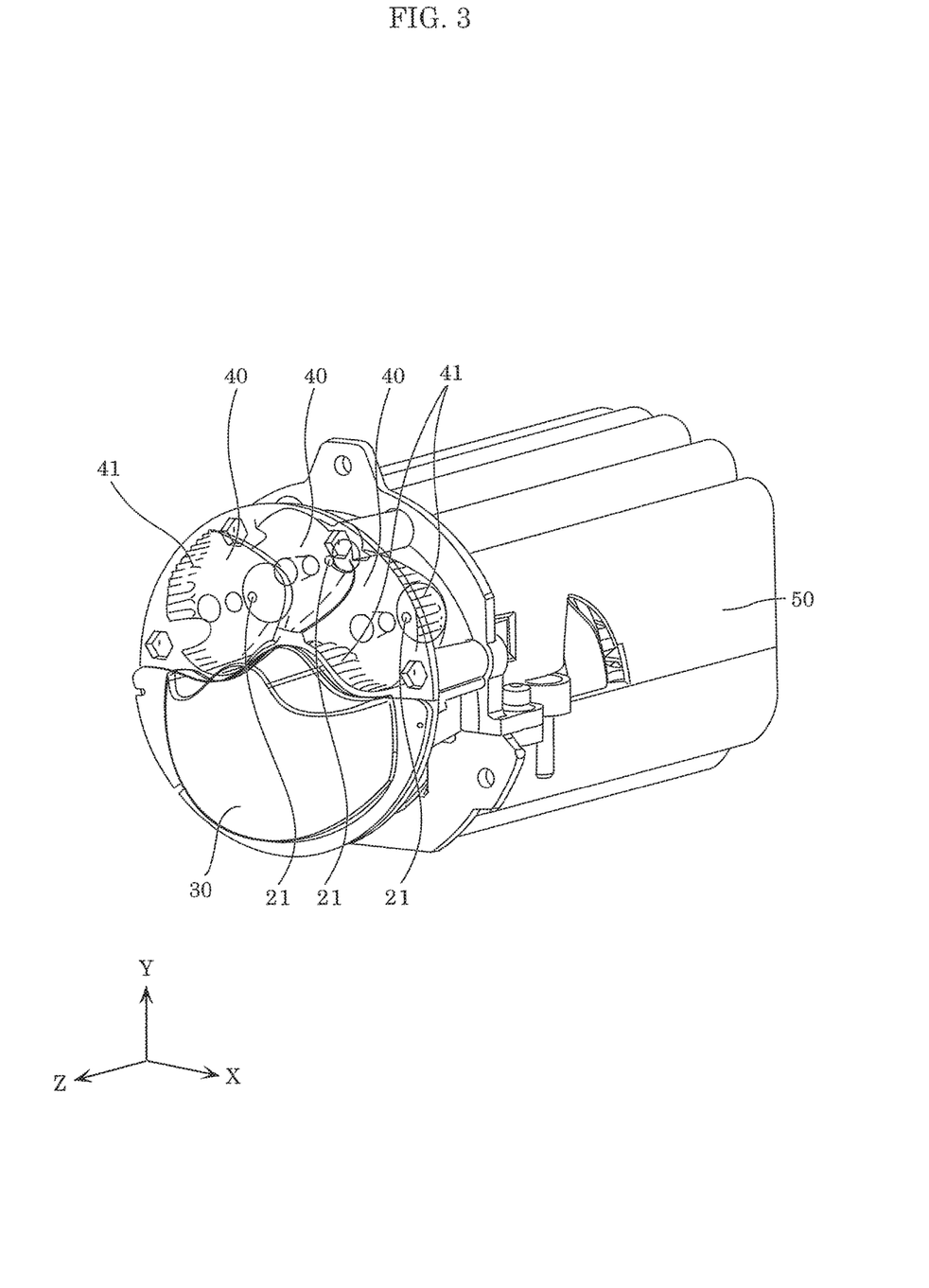
FIG. 3 is a perspective view of a lighting apparatus according to an exemplary embodiment of the present disclosure when a cover of the lighting apparatus is removed.
Figure 4:
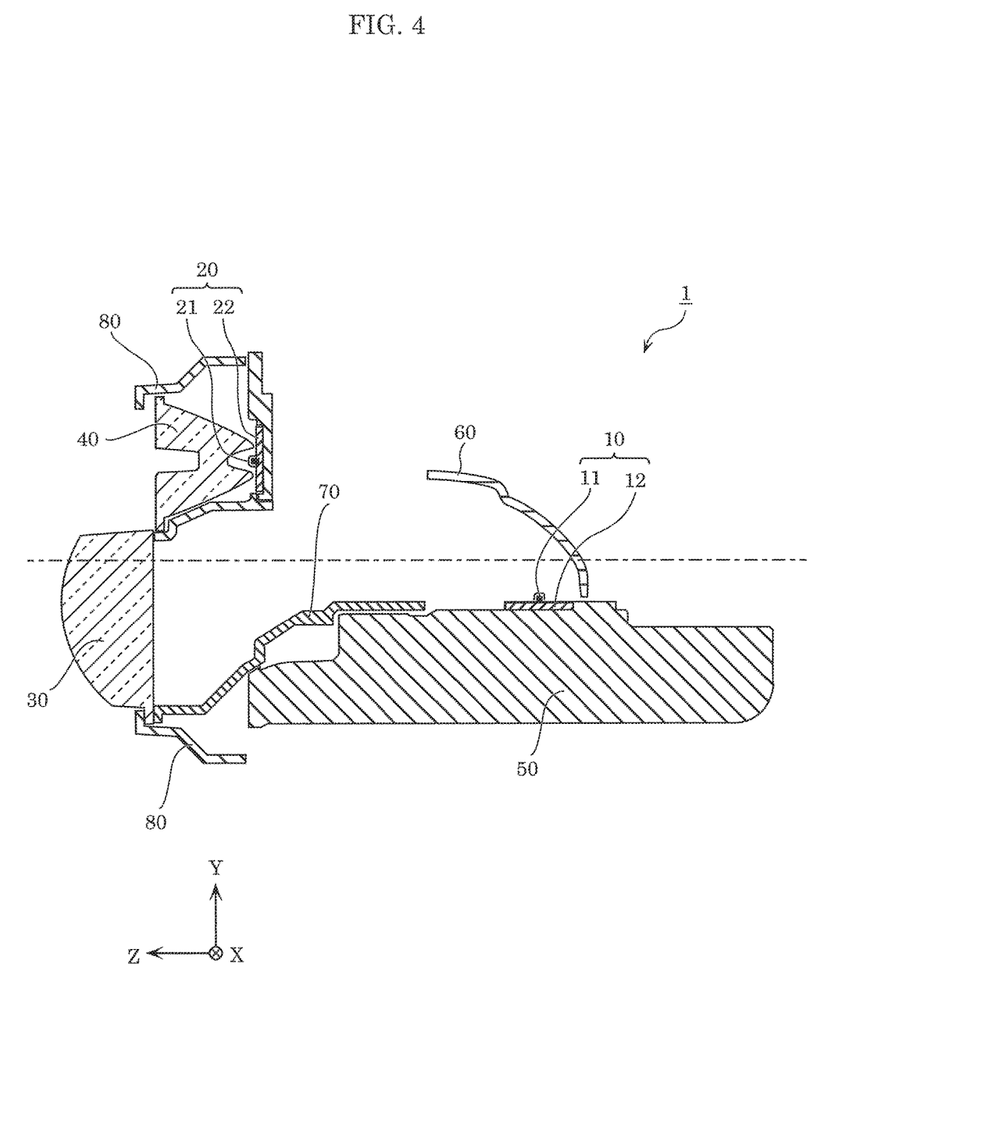
FIG. 4 is a cross sectional view of a lighting apparatus according to an exemplary embodiment of the present disclosure.

As illustrated in FIG. 2 through FIG. 4, lighting apparatus 1 includes low beam light source module 10, high beam light source module 20, low beam lens 30, a plurality of high beam lenses 40, heat dissipator 50, reflector 60, shield 70, and cover 80. Although not illustrated in the drawings, lighting apparatus 1 further includes a lighting controller that controls low beam light source module 10 and high beam light source module 20.

Lighting apparatus 1 is an integrated lamp capable of emitting a high beam, which is a driving beam, and a low beam, which is a passing beam. Note that the high beam illuminates an area far ahead of automobile 100, and the low beam illuminates an area forward and downward of automobile 100.

When viewed along the lighting direction (i.e., along the Z axis), lighting apparatus 1 fits within a predetermined circular region. More specifically, low beam light source module 10, high beam light source module 20, low beam lens 30, the plurality of high beam lenses 40, heat dissipator 50, reflector 60, shield 70, and cover 80 form a unit that fits within a predetermined circular region when viewed along the Z axis. The predetermined circular region is, for example, ⌀ 70 mm (in diameter).

Hereinafter, each element of lighting apparatus 1 will be described in detail.

Low Beam Light Source Module

Low beam light source module 10 is a first light source module that emits light for short-distance illumination. More specifically, low beam light source module 10 is a light-emitting diode (LED) module for generating a low beam and is turned on when an area forward and downward of vehicle body 110 is to be illuminated—that is, more specifically, when the road surface is to be illuminated.

Low beam light source module 10 is turned on when the surrounding environment is dark, such as at night or in a tunnel. In the exemplary embodiment, low beam light source module 10 is turned on when just the low beam is to be emitted (for short-distance illumination).

Low beam light source module 10 is a white light source and is, for example, a B-Y type white LED light source, which emits white light using a yellow phosphor and a blue LED chip that emits blue light. Alternatively, low beam light source module 10 may be a white LED light source that emits white light using LED chips emitting blue, red, and green light.

As illustrated in FIG. 4, low beam light source module 10 includes low beam light-emitting device 11 and substrate 12 on which low beam light-emitting device 11 is mounted.

Low beam light source module 10 may be a surface mount device (SMD) module and, alternatively, may be a chip on board (COB) module.

When low beam light source module 10 is an SMD module, low beam light-emitting device 11 is an SMD LED device that has an LED chip (bare chip) mounted and sealed with a sealant (phosphor-containing resin) in a resin package. When low beam light source module 10 is a COB module, low beam light-emitting device 11 is an LED chip (bare chip) itself, and is directly mounted on substrate 12. In this case, the LED chip mounted on substrate 12 is sealed with a sealant such as a phosphor-containing resin.

Low beam light source module 10 is fixed to heat dissipator 50. More specifically, substrate 12 is placed on and fixed to a predetermined placement surface of heat dissipator 50. In the exemplary embodiment, substrate 12 is disposed lying down (i.e., disposed horizontally) so that low beam light source module 10 emits light upward. In other words, the optical axis of low beam light source module 10 (low beam light-emitting device 11) is parallel to the Y axis.

Low beam light-emitting device 11 is one example of the first light source, and emits light that passes through low beam lens 30. Low beam light-emitting device 11 is disposed behind low beam lens 30. Low beam light-emitting device 11 is thermally coupled to heat dissipator 50.

Substrate 12 is, for example, a ceramic substrate including, for example, alumina, a resin substrate including resin, or an insulated metal substrate including a metal base covered by a layer of insulating material. Substrate 12 has a shape in a plan view corresponding to the shape of the placement surface of heat dissipator 50 on which substrate 12 is placed.

High Beam Light Source Module

High beam light source module 20 is a second light source module that emits light for long-distance illumination. More specifically, high beam light source module 20 is an LED module for generating a high beam and is turned on when an area far ahead of vehicle body 110 (including areas above the horizon plane) is to be illuminated.

High beam light source module 20 is turned on when the surrounding environment is dark, such as at night or in a tunnel, and there are no oncoming vehicles in the oncoming traffic lane. More specifically, high beam light source module 20 is turned on when the high beam is to be emitted.

High beam light source module 20 is a white light source and is, for example, a B-Y type white LED light source, which emits white light using a yellow phosphor and a blue LED chip that emits blue light. Alternatively, high beam light source module 20 may be a white LED light source that emits white light using LED chips emitting blue, red, and green light.

High beam light source module 20 may be an SMD module and, alternatively, may be a COB module. Details regarding the structures of SMD and COB modules are the same as described with respect to low beam light source module 10.

As illustrated in FIG. 3 and FIG. 4, high beam light source module 20 includes three high beam light-emitting devices 21 and substrate 22 on which the three high beam light-emitting devices 21 are mounted. Note that the number of high beam light-emitting devices 21 is not limited to three; two or more is acceptable.

High beam light source module 20 is fixed to heat dissipator 50. More specifically, substrate 22 is placed on and fixed to a predetermined placement surface of heat dissipator 50. In the exemplary embodiment, substrate 22 is disposed standing up (i.e., disposed vertically) so that high beam light source module 20 emits light forward. In other words, the optical axis of high beam light source module 20 (high beam light-emitting device 21) is parallel to the Z axis.

High beam light-emitting device 21 is one example of the second light source, and emits light that passes through high beam lens 40. The three high beam light-emitting devices 21 may emit the same color and amount of light and, alternatively, may emit different colors and amounts of light from one another.

High beam light-emitting devices 21 are disposed farther forward (i.e., farther in the positive direction of the Z axis) than low beam light-emitting device 11. High beam light-emitting devices 21 are disposed behind the plurality of high beam lenses 40 in one-to-one correspondence. High beam light-emitting devices 21 are thermally coupled to heat dissipator 50.

The three high beam light-emitting devices 21 emit light that passes through the three high beam lenses 40. Moreover, the light passing through the three high beam lenses 40 may collectively illuminate the same area and, alternatively, may illuminate different areas.

Substrate 22 is, for example, a ceramic substrate including, for example, alumina, a resin substrate including resin, or an insulated metal substrate including a metal base covered by a layer of insulating material. Substrate 22 has a shape in a plan view corresponding to the shape of the placement surface of heat dissipator 50 on which substrate 22 is placed.

Low Beam Lens

Low beam lens 30 is one example of the first lens, and is disposed in a path of light reflected by reflector 60 and transmits the light from reflector 60 along a predetermined lighting direction. More specifically, low beam lens 30 is a projection lens that transmits in a forward direction light emitted by low beam light source module 10. Low beam lens 30 is disposed in the lower front portion of lighting apparatus 1. Low beam light source module 10 is disposed behind low beam lens 30.

Light emitted by low beam light source module 10 reflects off reflector 60, enters low beam lens 30 through the entry surface of low beam lens 30, and exits low beam lens 30 through the exit surface of low beam lens 30. Light exiting low beam lens 30 illuminates the low beam illumination area of automobile 100 (i.e., an area forward and downward of automobile 100). Note that the entry surface is the back planar surface of low beam lens 30, and the exit surface is the front curved surface (for example, a spherical or oval spherical surface) of low beam lens 30.

In the exemplary embodiment, low beam lens 30 is more forwardly disposed than low beam light source module 10 and shield 70 (i.e., disposed farther in the positive direction of the Z axis). Low beam lens 30 is also more forwardly disposed than high beam lens 40. More specifically, low beam lens 30 is disposed such that the entry surface of low beam lens 30 and the exit surface (front major surface) of high beam lens 40 are approximately flush with one another in the direction of the Z axis. Positioning of low beam lens 30 is achieved by, for example, low beam lens 30 being fixed to shield 70 (or heat dissipator 50).

Low beam lens 30 can be manufactured by, for example, injection molding using a light-transmissive resin such as acryl (PMMA), polycarbonate (PC), or a cyclic olefin resin. For example, low beam lens 30 is a portion of a sphere or oval sphere. More specifically, the lower portion of low beam lens 30 has the shape of a quarter slice of a sphere (one quarter of a sphere), and the upper portion has the shape of one quarter of a sphere with portions in front of the three high beam lens 40 removed.

High Beam Lens

High beam lens 40 is one example of the second lens, and is a projection lens that transmits light emitted by high beam light source module 20. In the exemplary embodiment, three high beam light-emitting devices 21 are disposed behind three high beam lenses 40 in one-to-one correspondence. The number of high beam lenses 40 is not limited to three; two or more is acceptable.

The three high beam lenses 40 are disposed along the periphery of low beam lens 30. More specifically, the three high beam lenses 40 are disposed above low beam lens 30, along the periphery of low beam lens 30. In other words, the three high beam lenses 40 are disposed in the front upper portion of lighting apparatus 1.

Moreover, each of high beam light-emitting devices 21 is disposed behind a different one of the three high beam lenses 40. Light emitted by each of the three high beam light-emitting devices 21 passes through its corresponding high beam lens 40 and illuminates the high beam area of automobile 100 (i.e., an area far ahead of automobile 100). The light passing through plurality of high beam lenses 40 form the high beam.

High beam lens 40 is a collimating lens, which is one example of a projection lens. More specifically, the three high beam lenses 40 are formed by grouping three collimating lenses together. Each of the three high beam lenses 40 converts incident light into collimated light. More specifically, each of the three high beam lenses 40 has a truncated cone shape whose diameter widens toward the front. High beam light-emitting devices 21 are disposed to the small diameter sides of the three high beam lenses 40.

High beam lens 40 can be manufactured by, for example, injection molding using a light-transmissive resin such as acryl (PMMA), polycarbonate (PC), or a cyclic olefin resin.

In the exemplary embodiment, low beam lens 30 is a separate component from the three high beam lenses 40, but low beam lens 30 and the three high beam lenses 40 may be integrally formed. Moreover, in the exemplary embodiment, the three high beam lenses 40 are integrally formed together, but each of the three high beam lenses 40 may be a separate component. Note that the arrangement of the three high beam lenses 40—that is to say, the three high beam light-emitting devices 21—is not limited to the example illustrated in the drawings.

A portion of a circumferential edge of at least one of the plurality of high beam lenses 40 includes knurled surface 41. Knurled surface 41 will be described in detail later.

Heat Dissipator

Heat dissipator 50 is a heat dissipating component for dissipating and releasing out (to the atmosphere) heat generated by low beam light source module 10 and high beam light source module 20. As such, heat dissipator 50 includes, for example, a material with a high rate of heat transfer, such as metal. Heat dissipator 50 is, for example, an aluminum die cast heat dissipator including composite aluminum. Heat dissipator 50 includes a plurality of heat dissipating fins.

Reflector

Reflector 60 reflects light emitted by low beam light-emitting device 11. Reflector 60 is disposed above low beam light source module 10. Reflector 60 includes a light reflective surface (curved reflective surface) that reflects diagonally forward and downward light emitted upward by low beam light source module 10, such that the light is incident on low beam lens 30.

Reflector 60 is fixed to, for example, heat dissipator 50. Reflector 60 is, for example, formed by resin molding using a heat resistant resin, and a reflective film is formed on the surface of reflector 60. For example, polycarbonate (PC) can be used as the high resistant resin. Alternatively, instead of a heat resistant resin, fiber reinforced plastic (FRP) or a bulk molding compound (BMC) may be used. The reflective film is, for example, a metal deposition film such as an aluminum deposition film. The reflective film specularly reflects light emitted by low beam light-emitting device 11.

Shield

Shield 70 is one example of a shield that blocks a portion of the light reflected by reflector 60. More specifically, shield 70 is a structure that defines a predetermined cutoff line—which is a boundary between dark and light areas—by blocking a portion of light emitted by low beam light source module 10.

Shield 70 is disposed between reflector 60 and low beam lens 30. More specifically, shield 70 is fixed to heat dissipator 50.

Shield 70 is, for example, formed using a heat resistant resin or fiber reinforced plastic, similar to reflector 60. Note that shield 70 may include metal instead of resin. Shield 70 may also be integrally formed with heat dissipator 50.

Cover

As illustrated in FIG. 2, cover 80 is an approximately ring-shaped frame. Cover 80 is disposed so as to surround low beam lens 30 and high beam lenses 40. For example, in a front view of lighting apparatus 1, the outline of cover 80 substantially matches the outer diameter of lighting apparatus 1. Cover 80 is, for example, formed by resin molding using a resin material.

Knurled Surface

Knurled surface 41 is one example of the textured surface having predetermined light diffusing characteristics, and is formed as a portion of the circumferential edge of at least one of the plurality of high beam lenses 40. In the exemplary embodiment, knurled surface 41 is formed on the circumferential edge of the two outer high beam lenses 40 among the three high beam lenses 40.

Knurled surface 41 may be formed by a rolling process or a cutting process, for example. Knurled surface 41 may have, for example, an angular pattern, a full face pattern, or a diamond pattern. More specifically, the pattern used for knurled surface 41 is determined in accordance with the desired lighting condition.

Note that when high beam lenses 40 are made by resin molding, knurled surface 41 may be made at the same time as high beam lenses 40. In other words, by using a mold including a pattern for knurled surface 41, high beam lens 40 including knurled surface 41 can be made.

In the exemplary embodiment, by providing a plurality of high beam light-emitting devices 21 and a plurality of high beam lenses 40, high beam light is light emitted after passing through the plurality of high beam lenses 40.

As such, each of the plurality of high beam light-emitting devices 21 does not consume a lot of energy and therefore does not generate much heat. Thus, as illustrated in FIG. 2 and FIG. 3, heat dissipator 50 can be made compact. As a result, the entire lighting apparatus 1 can be made to be more compact.

However, when the high beam light is formed using a plurality of high beam lenses 40 and a plurality of high beam light-emitting devices 21, the high beam light is uneven overall, which reduces lighting effectiveness.

Figure 5:
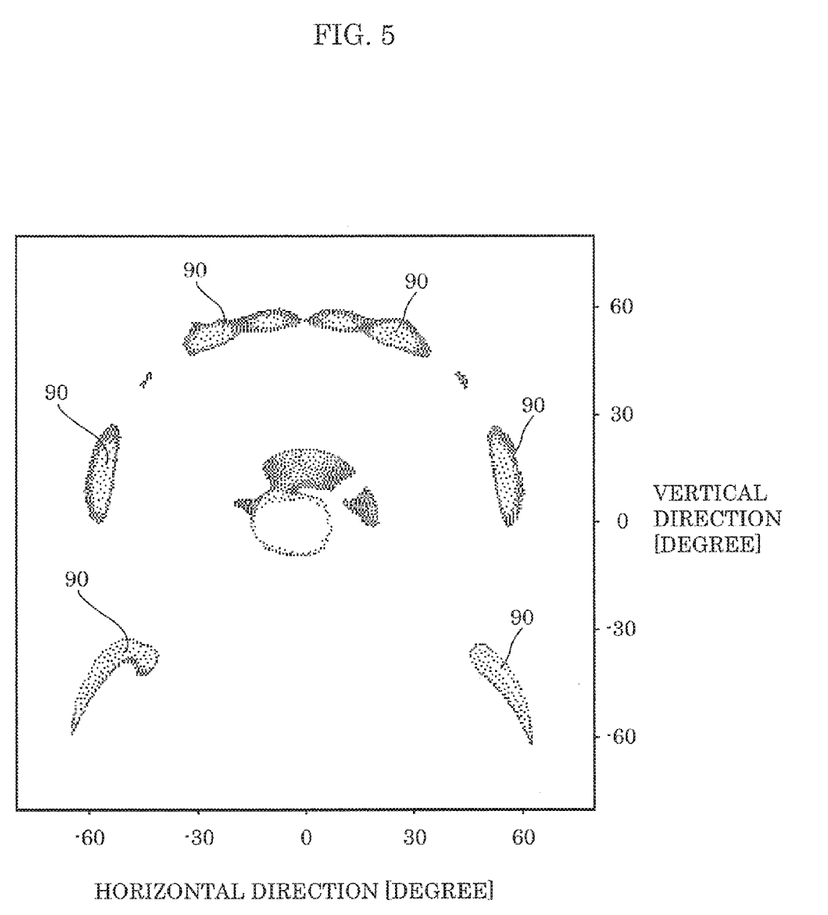
FIG. 5 illustrates the lighting effectiveness of a lighting apparatus according to an exemplary embodiment of the present disclosure.

FIG. 5 illustrates the lighting effectiveness of lighting apparatus 1 according to the exemplary embodiment. More specifically, FIG. 5 illustrates the unevenness of high beam light emitted by a lighting apparatus including three high beam light-emitting devices 21 and three high beam lenses 40 which do not include knurled surface 41. In other words, FIG. 5 illustrates the spatial luminance distribution of light emitted through three high beam lenses 40 (that do not include knurled surface 41). Note that in FIG. 5, portions of the light that are high in luminance are emphasized.

As illustrated in FIG. 5, a plurality of regions 90 substantially high in luminance appear. As a result, regions 90 in front of automobile 100 are unusually bright compared to other regions. To the driver, this makes the other regions appear dark, whereby light sufficient for driving is not achieved.

In light of this, in the exemplary embodiment, high beam lens 40 is a collimating lens and includes, on the circumferential edge of the collimating lens, knurled surface 41. In this example, the size and shape of knurled surface 41 was determined with reference to the lighting condition illustrated in FIG. 5 to reduce the high luminance regions 90.

Figure 6:
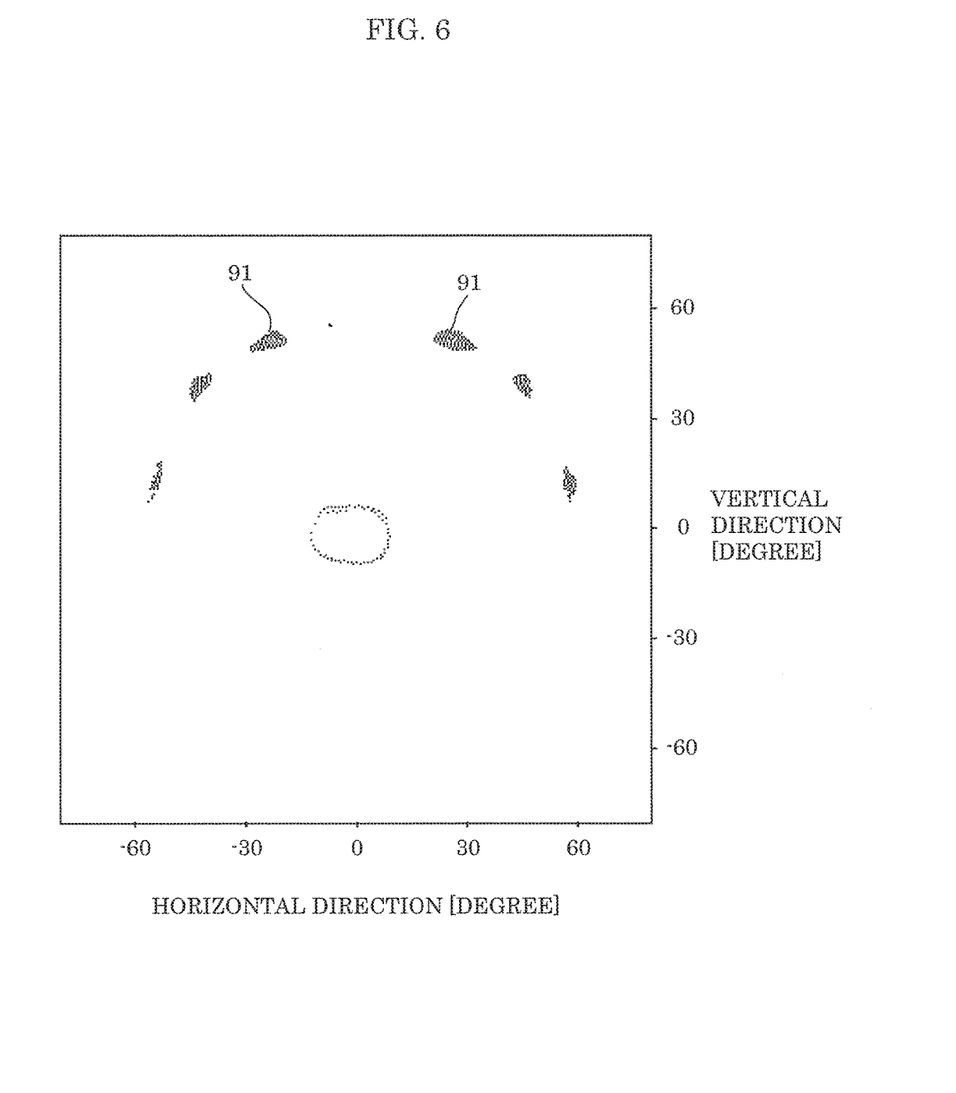
FIG. 6 illustrates the lighting effectiveness of a lighting apparatus according to an exemplary embodiment of the present disclosure.

As a result, in the exemplary embodiment, the surface area of the high luminance regions 91 is significantly less than that of regions 90, as illustrated in FIG. 6. Note that FIG. 6 is for illustrating the lighting effectiveness of lighting apparatus 1 according to the exemplary embodiment. More specifically, FIG. 6 illustrates the unevenness of high beam light emitted by lighting apparatus 1 including three high beam light-emitting devices 21 and three high beam lenses 40 which include knurled surface 41. In other words, FIG. 6 illustrates the spatial luminance distribution of light emitted through three high beam lenses 40. Note that in FIG. 6, portions of the light that are high in luminance are emphasized.

As can be seen by comparing FIG. 6 against FIG. 5, with lighting apparatus 1 according to the exemplary embodiment, glare in the high beam light overall is reduced and unevenness of light is reduced, resulting in an increase in lighting effectiveness.

Advantageous Effects, Etc.

As described above, lighting apparatus 1 according to the exemplary embodiment includes: low beam lens 30; low beam light-emitting device 11 disposed behind low beam lens 30; a plurality of high beam lenses 40 disposed along a periphery of low beam lens 30; and a plurality of high beam light-emitting devices 21 disposed behind the plurality of high beam lenses 40 in one-to-one correspondence. At least one of the plurality of high beam lenses 40 includes, on a circumferential edge, knurled surface 41.

With this, as can be seen by comparing FIG. 6 to FIG. 5, the overall unevenness of light is reduced as a result of including knurled surface 41 on the circumferential edge of high beam lens 40. This results in an increase in lighting effectiveness. Moreover, since lighting apparatus 1 includes a plurality of high beam light-emitting devices 21, the heat generated by each high beam light-emitting device 21 can be reduced. With this, heat dissipator 50 can be made compact, whereby lighting apparatus 1 can be made compact.

Moreover, for example, high beam lenses 40 are collimating lenses, and the collimating lenses include, on a circumferential edge, knurled surface 41. Note that one lens among the plurality of high beam lenses 40 may be a collimating lens, and each of the remaining high beam lenses 40 may be a type of projection lens other than a collimating lens.

With this, since high beam lens 40 is a collimating lens, light emitted by high beam light-emitting device 21 can be transmitted forward as collimated light. As a result, the light passing through each of the plurality of high beam light-emitting devices 21 can be directed to a desired area, whereby a high beam can be formed without needing to emit more light than is required. In other words, by using a collimating lens, a light distribution having a narrow angle and high luminosity can be achieved. With this, since the amount of heat generated by each high beam light-emitting device 21 can be reduced, heat dissipator 50 can be made compact, whereby lighting apparatus 1 can be made compact.

Moreover, for example, at least one of low beam light-emitting device 11 and the plurality of high beam light-emitting devices 21 includes an LED.

With this, since LEDs are used, the amount of heat generated can be reduced. Therefore, heat dissipator 50 can be made compact, whereby lighting apparatus 1 can be made compact.

Moreover, for example, low beam lens 30 is a separate component from the plurality of high beam lenses 40.

This reduces the optical influence one lens has on the other. Stated differently, even when high beam lenses 40 includes knurled surface 41 at its circumferential edge, it is possible to reduce the influence this has on the low beam.

Moreover, for example, automobile 100 according to the exemplary embodiment includes lighting apparatus 1 and vehicle body 110 including lighting apparatus 1 installed in a front portion.

With this, since unevenness in the lighting of the high beam generated by lighting apparatus 1 can be reduced, lighting sufficient for driving can be achieved. Thus, an improved driving environment can be created for the driver, which facilitates safe driving.

Variation

Figure 7:
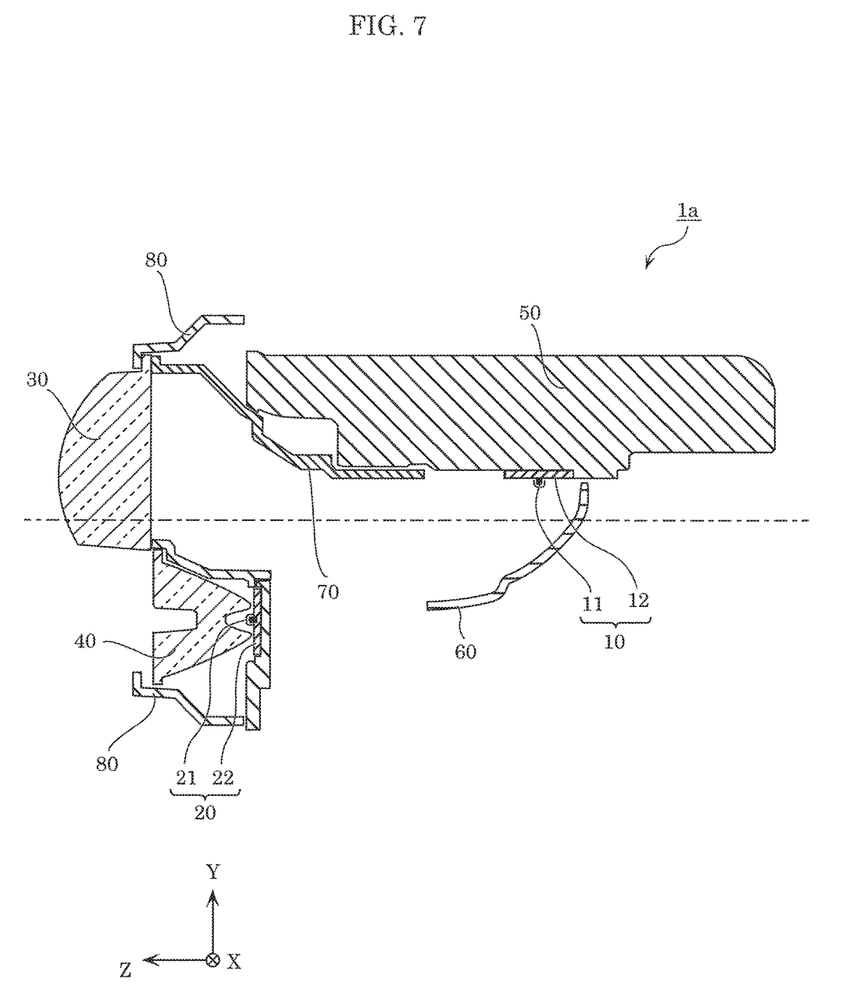
FIG. 7 is a cross sectional view of a lighting apparatus according to a variation of an exemplary embodiment of the present disclosure.

Next, a lighting apparatus according to a variation of the exemplary embodiment will be described with reference to FIG. 7. FIG. 7 is a cross sectional view of lighting apparatus 1a according a variation of the exemplary embodiment. More specifically, FIG. 7 is a cross sectional view corresponding to the cross section illustrated in FIG. 4.

According to this variation, low beam lens 30 is disposed in the front upper portion of lighting apparatus 1a, and low beam light source module 10 is disposed behind low beam lens 30.

Moreover, the three high beam lenses 40 are disposed along the periphery of low beam lens 30. More specifically, the three high beam lenses 40 are disposed below low beam lens 30, along the periphery of low beam lens 30.

Stated differently, in lighting apparatus 1a according to this variation, the arrangement of low beam lens 30 and high beam lenses 40 has been reversed vertically with respect to the arrangement in lighting apparatus 1 according to the exemplary embodiment. Accordingly, the arrangement of low beam light source module 10, high beam light source module 20, heat dissipator 50, reflector 60, and shield 70 is also reversed vertically.

Even with this configuration, similar to the exemplary embodiment, the overall unevenness of light can be reduced, thereby increasing the effectiveness of the lighting. Moreover, since the amount of heat generated by each high beam light-emitting device 21 can be reduced, heat dissipator 50 can be made compact, whereby lighting apparatus 1a can be made compact.

Other Variations, Etc.

The lighting apparatus according to the present disclosure has hereinbefore been described based on an exemplary embodiment. The lighting apparatus is not, however, limited to the above described exemplary embodiment.

For example, in the exemplary embodiment, knurled surface 41 is given as one example of the textured surface having light diffusing characteristics, but the textured surface is not limited to this example. For example, instead of knurled surface 41, the textured surface may be formed by a graining process, or by forming dots on the surface.

Moreover, for example, in the exemplary embodiment, automobile 100 includes two lighting apparatuses 1 (headlamps 120), but automobile 100 is not limited to this example. For example, automobile 100 may include three or more lighting apparatuses 1, such as two lighting apparatuses 1 on each of the left and right sides of vehicle body 110, and, alternatively, may include only one lighting apparatus 1.

Moreover, for example, the exemplary embodiment is applied to headlamps which emit low beams and high beams, but may be applied to beacon lamps, fog lamps or daytime running light (DRL) headlamps.

Moreover, for example, in the exemplary embodiment, LEDs are given as an example of the light-emitting devices, but laser devices such as semiconductor lasers, or light-emitting devices such as organic electro-luminescence (EL devices) and non-organic EL devices may be used.

Moreover, for example, in the exemplary embodiment, automobile 100 is exemplified as a four-wheeled automobile, but automobile 100 may be a different automobile such as a two-wheeled automobile.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A lighting apparatus, comprising:
    a first lens that is a projection lens;
    a first light source disposed behind the first lens;
    a plurality of second lenses disposed along a periphery of the first lens, and positioned outside the first lens in a front view;
    a plurality of second light sources disposed behind the plurality of second lenses in one-to-one correspondence;
    a shield disposed between the first light source and the first lens, the shield defining a cutoff line by blocking a portion of light from the first light source; and
    a frame that is approximately ring-shaped and disposed to surround the first lens and the plurality of second lenses,
    wherein at least one of the plurality of second lenses has a frustoconical shape and includes a) at least one front facing side, b) a circumferential edge rear facing side, and c) disposed on a portion less than whole of the circumferential edge rear facing side, a textured surface having light diffusing characteristics.

2. The lighting apparatus according to claim 1, wherein at least one of the plurality of second lenses is a collimating lens, and the collimating lens includes, on a circumferential edge, the textured surface having light diffusing characteristics.

3. The lighting apparatus according to claim 1, wherein at least one of the first light source and the plurality of second light sources comprises a light-emitting diode (LED) or a laser device.

4. The lighting apparatus according to claim 1, wherein the first lens is a separate component from the plurality of second lenses.

5. The lighting apparatus according to claim 1, wherein the textured surface comprises a knurled surface.

6. An automobile, comprising:
    the lighting apparatus according to claim 1; and
    a vehicle body including the lighting apparatus installed in a front portion.

7. The lighting apparatus according to claim 1, wherein the plurality of second lenses includes three second lenses and only one or two of the three second lenses include the textured surface having light diffusing characteristics.

* * * * *